(12) United States Patent
Woodworth et al.

(10) Patent No.: US 11,997,013 B2
(45) Date of Patent: May 28, 2024

(54) TRAFFIC MONITORING AND ORCHESTRATION

(71) Applicant: Level 3 Communications, LLC, Broomfield, CO (US)

(72) Inventors: John R. B. Woodworth, Amissville, VA (US); Dean Ballew, Sterling, VA (US); Stewart Bamford, Cambridgeshire (GB)

(73) Assignee: Level 3 Communications, LLC, Broomfield, CO (US)

( * ) Notice: Subject to any disclaimer, the term of this patent is extended or adjusted under 35 U.S.C. 154(b) by 85 days.

(21) Appl. No.: 17/739,743

(22) Filed: May 9, 2022

(65) Prior Publication Data
US 2022/0417147 A1    Dec. 29, 2022

Related U.S. Application Data

(60) Provisional application No. 63/214,668, filed on Jun. 24, 2021.

(51) Int. Cl.
*H04L 45/12*    (2022.01)
*H04L 45/00*    (2022.01)
*H04L 45/02*    (2022.01)
*H04L 45/24*    (2022.01)

(52) U.S. Cl.
CPC .............. *H04L 45/70* (2013.01); *H04L 45/08* (2013.01); *H04L 45/12* (2013.01); *H04L 45/24* (2013.01)

(58) Field of Classification Search
CPC ......... H04L 45/70; H04L 45/08; H04L 45/12; H04L 45/24
See application file for complete search history.

(56) References Cited

U.S. PATENT DOCUMENTS

| | | | |
|---|---|---|---|
| 9,350,706 B1* | 5/2016 | Smith | H04L 63/1458 |
| 2002/0004846 A1* | 1/2002 | Garcia-Luna-Aceves | H04L 67/101 709/245 |
| 2002/0069278 A1* | 6/2002 | Forslow | H04L 63/0272 709/225 |
| 2006/0018317 A1* | 1/2006 | Jimmei | H04L 63/12 370/389 |

(Continued)

*Primary Examiner* — Atique Ahmed

(57) ABSTRACT

Dynamic and self-healing optimized traffic rerouting is provided. A system and method are described for determining and implementing optimized traffic routing decision. A route orchestration system monitors network resource performance characteristics information for identifying a traffic redirection triggering event and for determining an optimized traffic control decision based on the network resource performance characteristics information. The decision may include software defined networking (SDN) instructions that may be communicated to one or more network resources (e.g., PE devices, P devices, and/or routers) that may cause traffic to be rerouted the one or more targeted servers. For example, the optimized traffic control decision may be determined to improve load balancing amongst performing servers and other network resources in the network while reducing or minimizing administrative costs. Network resources may include a programmatic component that allows the optimized traffic control decision determined by the route orchestration system to be implemented by the resource.

19 Claims, 4 Drawing Sheets

(56) References Cited

U.S. PATENT DOCUMENTS

| | | | |
|---|---|---|---|
| 2008/0235400 A1* | 9/2008 | Slocombe | H04L 67/54 |
| | | | 709/245 |
| 2009/0113057 A1* | 4/2009 | Van der Merwe | H04L 67/10 |
| | | | 709/227 |
| 2011/0026435 A1* | 2/2011 | Weniger | H04L 63/029 |
| | | | 370/254 |
| 2013/0275589 A1* | 10/2013 | Karthikeyan | H04L 47/125 |
| | | | 709/224 |
| 2015/0215388 A1* | 7/2015 | Kontothanassis | H04L 67/1008 |
| | | | 709/226 |
| 2017/0063783 A1* | 3/2017 | Yong | H04L 69/22 |
| 2018/0152877 A1* | 5/2018 | Van Lieshout | H04W 40/36 |
| 2020/0169613 A1* | 5/2020 | King, V | H04L 67/148 |
| 2021/0320854 A1* | 10/2021 | King, V | H04L 43/0817 |

* cited by examiner

TRAFFIC MONITORING AND ORCHESTRATION

CROSS-REFERENCE TO RELATED APPLICATIONS

This application claims the benefit of U.S. Provisional Application No. 63/214,668 filed Jun. 24, 2021, entitled "Traffic Monitoring and Orchestration," which is incorporated herein by reference in its entirety.

TECHNICAL FIELD

Aspects of the present disclosure generally relate to network resource selection and delivery in a computer network, and more particularly to processing or otherwise manipulating routing of content or communications from a computer network.

BACKGROUND

Telecommunication or other types of computer networks provide for the transmission of information across some distance through terrestrial, wireless, or satellite communication networks. Such communications may involve voice, data, or multimedia information, among others. Typically, such networks include several servers or other resources from which the content or network services can be supplied to a requesting end user. To decrease latency, increase throughput, and reduce the amount of traffic being transmitted through a related network, a network will typically attempt to provide the content or communications from a network component that is separated by as little network infrastructure as possible from the requesting device (e.g., so that the path with the fewest number of network elements and shortest distance are utilized between the server and the end user).

Under normal operating conditions, a route that utilizes the least number of network elements and shortest communication distance to provide content to an end user device may be the optimal or "best" transmission path. However, a variety of conditions may create an environment where such a route may not provide optimal network resource utilization and/or content delivery. For example, in some instances, a server associated with an Anycast network may become congested, be over utilized, and/or be the target of a network attack. In some examples, additional servers in the network could be utilized to redirect traffic in such instances. However, due to the topologic and/or geographic distance of these additional servers, a typical Anycast system may not be able to use these additional routers and servers to load balance network traffic. As a result, performance of the network may be negatively impacted.

SUMMARY

The present disclosure describes a system and method for utilizing traffic monitoring, orchestration, and software-defined networking to provide dynamic and self-healing optimized traffic rerouting.

In some examples, a system for redirecting traffic in a network is provided, the system comprising: at least one processor; and a memory coupled to the at least one processor, the memory including instructions that when executed by the at least one processor cause the system to: monitor network resource performance characteristics information associated with a plurality of network segments in a network; detect a traffic redirection triggering event associated with a first network segment of the plurality of network segments; based on detecting the traffic redirection triggering event, determine a second network segment of the plurality of network segments to redirect traffic to from the first network segment; and send a set of instructions to at least one network resource in the network causing the at least one network resource to redirect at least a portion of ingress traffic to the second network segment that would normally be directed to the first network segment, wherein the second network segment is more topologically distant from the at least one network resource than the first network segment.

In some examples, a method for redirecting traffic in a network is provided, comprising: monitoring network resource performance characteristics information associated with a plurality of network segments in a network; detecting a traffic redirection triggering event associated with a first network segment of the plurality of network segments; based on detecting the traffic redirection triggering event, determining a second network segment of the plurality of network segments to redirect traffic to from the first network segment; and sending a set of instructions to at least one network resource in the network causing the at least one network resource to redirect at least a portion of ingress traffic to the second network segment that would normally be directed to the first network segment, wherein the second network segment is more topologically distant from the at least one network resource than the first network segment.

In some examples, a computer readable storage device is provided that includes executable instructions which, when executed by a processor redirect traffic in a network, the instructions comprising: monitoring network resource performance characteristics information associated with a plurality of network segments in an Anycast network; detecting a traffic redirection triggering event associated with a first network segment of the plurality of network segments; based on detecting the traffic redirection triggering event, determining a second network segment of the plurality of network segments to redirect traffic to from the first network segment; and sending a set of instructions to the at least one ingress network resource in the network causing the at least one ingress network resource to redirect at least a portion of ingress traffic to the second network segment that would normally be directed to the first network segment, wherein the second network segment is more topologically distant from the at least one ingress network resource than the first network segment.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Anycast s a network addressing and routing protocol in which a single destination IP address has multiple routing paths to two or more endpoint destinations. Current Anycast networks and various network segments of current Anycast networks are comprised of various network resources. Network resources may include routers and servers. In an example, each server associated with a network segment shares the same IP address. When a network segment transmits and/or receives data via the network resources, the network segment uses servers that are topologically and/or geographically closest to the network segment. Use of servers that are topologically/geographically closest to the network segment helps reduce and/or minimize administrative costs (e.g., bandwidth costs, number of hops) of the Anycast network. As a result, load times and network availability for end users can be improved.

However, in some instances and as discussed in detail below, a server associated with a network segment (or a particular IP address) may become congested or overwhelmed and drop packets. As a result, latency may increase, thereby negatively impacting the overall performance of the networking system. Due to the topologic and/or geographic distance of additional routers, a typical Anycast system may not be able to direct traffic to these additional routers and servers. Aspects of the present disclosure describe a system and method for instructing a network resource to reroute traffic to a targeted server that may be more topologically and/or geographically distant than a congested or overwhelmed server. For example, in response to a detection of a triggering event, network resources in an Anycast system (or in other networking systems) may be enabled to dynamically utilize these additional network resources to load balance or otherwise redirect network traffic. Although the examples herein are described with respect to an Anycast network, the examples may be applied to various types of network routing protocols. These and other examples will be explained in more detail below with respect to FIGS. 1-4.

Figure 1:
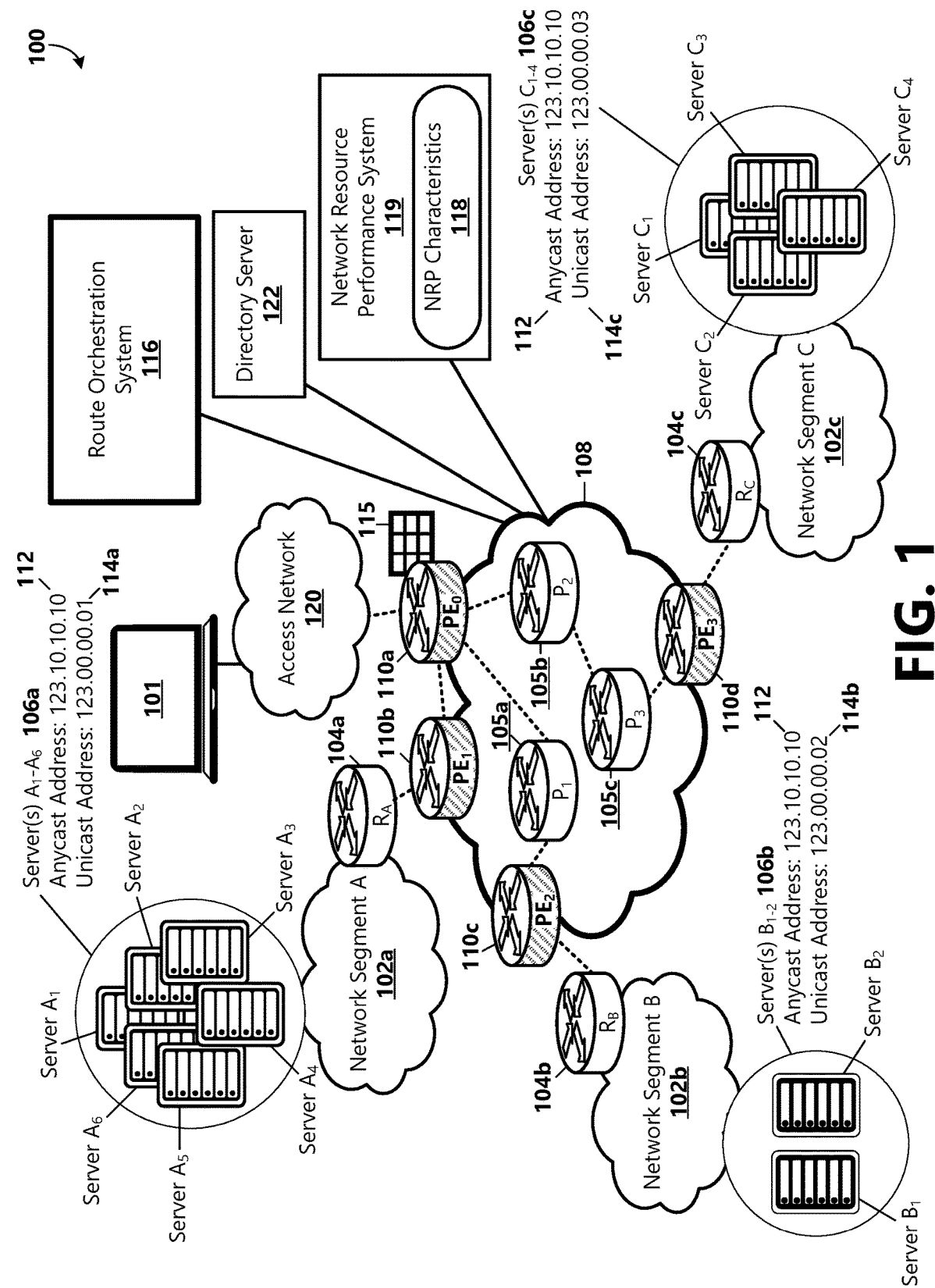
FIG. 1 is a block diagram illustrating an example networking system in which examples of the present disclosure may be practiced.

FIG. 1 illustrates an example networking system 100 in which examples of the present disclosure may be practiced. For example, the networking system 100 may include any type of telecommunications network that utilizes IP addresses for connecting one or more components of the networking system 100. For example, aspects of the disclosure may be utilized to connect an endpoint (e.g., end user device 101) of the networking system 100 to another endpoint in the networking system 100 (e.g., a content server, a conferencing server, a virtual private network (VPN) device, and the like). In some examples, the networking system 100 can be used to distribute content to one or more end user devices 101. For example, the networking system 100 may be configured to receive a request for content from an end user device 101 in the networking system 100 and determine a server 106a-n (generally, 106) or content providing component within the networking system 100 to provide the content to the end user device 101. As should be appreciated other network architectures and configurations are similarly contemplated and are within the scope of the present disclosure. The user device 101 may be one of various forms of computing devices, such as a personal computer, mobile device, tablet device, set-top box, video streaming device, or the like. Content may include, without limitation, videos, multimedia, images, audio files, text, documents, software, and other electronic resources. The end user device 101 may be configured to request, receive, process, and present content.

As illustrated, the networking system 100 may include an Internet Protocol (IP) network routing infrastructure (herein referred to generally as the network 108). In general, the network 108 may include an underlying IP network through which a request for content may be received and via which the content may be provided. For example, the network 108 may be one of various types of IP-based communication networks configured to transmit and receive communications and may include any number and types of telecommunications components for processing and transmitting the communications.

In some example implementations, the networking system 100 may include a number of access networks 120 and a number of different network segments 102a-n (generally, 102) that connect to the network 108. The example networking system 100 illustrated in FIG. 1 shows one access network 120 and three network segments 102 identified as Network Segment A 102a, Network Segment B 102b and Network Segment C 102c. Although one access network 120 and three network segments 102 are shown and described, the networking system 100 may include any number of access networks 120 and/or network segments 102. For example, some example networking systems 100 can include hundreds of network segments 102 and associated network resources.

In some examples, an access network 120 and/or a network segment 102 may be associated with a particular geographic location. According to an aspect, each network segment 102 may be associated with or otherwise have access to different network resources, such as various routers 104a-n (generally, 104) and/or servers 106a-n (generally, 106). For example and as shown, Network Segment A 102a may be associated with Router $R_A$ 104a and Servers $A_{1-6}$ 106a; Network Segment B 102b may be associated with Router $R_{B1}$ 104b and Servers $B_{1-2}$ 106b; and Network Segment C 102c may be associated with Router $R_C$ 104c and Servers $C_{1-4}$ 106c. As should be appreciated, the number of routers 104 and servers 106 shown and described in association with each network segment 102 is for illustrative purposes and is not limiting of the vast number of routers 104 and servers 106 that may be included in the networking system 100 may include any number of access networks 120 and/or network segments 102.

The network 108 may include a number of different ingress and egress access points, herein referred to as provider edge (PE) devices 110a-n (generally, 110) and provider core (P) devices 105a-n (generally, 105). In some examples, an ingress PE device (e.g., $PE_0$ 110a) may be configured to receive traffic originating from a source (e.g., an end user device 101 connected to an access network 120 connected to the network 108), look up the traffic's destination IP address, determine and assign a route for the traffic, and forward the traffic to an egress PE device (e.g., $PE_1$ 110b, $PE_2$ 110c, or $PE_3$ 110d) for delivery to a destination server 106 based on the determined route.

In some examples, one or more logical tunnels may be built between the various PE devices 110, P devices 105, and/or other routers 104 in the networking 108. For example, the logical tunnel(s) may be protocol agnostic and may be built using various types of tunneling protocols (e.g., IP in IPv4/IPv6 (IP in IP), Generic Routing Encapsulation (GRE), Multiprotocol Label Switching (MPLS)). In some examples, the logical tunnel may enable an access network 120 to utilize network segments 102 that may not be geographically and/or topologically proximate.

In an example implementation, the networking system 100 may be an Anycast networking system. The end user device 101 may be configured to connect to the network 108 through one or more access networks 120 to request content from a server 106. Servers $A_{1-6}$ 106a, Servers $B_{1-2}$ 106b, or Servers $C_{1-4}$ 106c may be Anycast servers configured to share and advertise a same Anycast IP address 112 (e.g., 123.10.10.10). In some examples Servers $A_{1-6}$ 106a, Servers $B_{1-2}$ 106b, and Servers $C_{1-4}$ 106c may be geographically dispersed, and each server 106 may each have a unique Unicast IP address 114 (e.g., Servers $A_{1-6}$ 106a may have an example Unicast Address 114a of 123.00.00.01; Servers $B_{1-2}$ 106b may have an example Unicast Address 114b of 123.00.00.02; and Servers $C_{1-4}$ 106c may have an example Unicast Address 114c of 123.00.00.03).

In some implementations, the end user device 101 may include an application with which a link name (e.g., a Uniform Resource Locator (URL) or other identifier) may be selected or otherwise entered. The link name may be associated with a network address (e.g., IP address) within the networking system 100 at which requested content may be obtained and provided to the end user device 101. For example, the user of the end user device 101 may enter a URL or make a selection of an option associated with a URL, such as http://www.examplescenario.com/content, via the application executing on the end user device 101. In some examples, a domain name of the requested content may be extracted by the application (www.examplescenario.com in this particular example scenario) and included in a request originating from the end user device 101 to a directory server 122 (e.g., domain name system (DNS) servers) to determine an IP address in the networking system 100 at which the content may be accessed. For example, the directory server 122 may operate to store and provide information about network resources as a collection of attributes associated with that resource or object. In some examples, the request to the directory server 122 may include an IP address associated with the end user device 101 and/or an IP address associated with a DNS of the access network 120. For example, the directory server 122 may be configured to resolve the domain name to an IP address from which the end user device 101 can retrieve the content.

According to an aspect, the PE devices 110, P devices 105, and routers 104 may use a routing protocol to share routing information. In some examples, the PE devices 110, P devices 105, and routers 104 may use Border Gateway Protocol (BGP) to advertise a plurality of paths between network resources. For example, network resource devices may broadcast BGP information in a BGP announcement about the access path to content serving components (e.g., servers 106) in the networking system 100. In general, BGP information may include a table of IP prefixes which designate network connectivity between autonomous systems (AS) or within AS networks (FIG. 1 shows a single AS for simplicity). BGP information for a network route may include path, network policies and/or rulesets for transmission along the path, among other information. The BGP information may also include Interior Gateway Protocol (IGP) information for network routes within an AS or network 108 and/or other network information that pertains to the transmission of content within and from the network 108.

In some examples, a BGP announcement may include a network identifier identifying the particular network that the content is stored on. Additional network identifiers between the end user device 101 and the stored content may be appended to or added to the BGP path information for the content. Thus, in one embodiment, the BGP path information may provide a series of identifiers for networks through which the content may be accessed by the end user device 101. According to an aspect, the PE devices 110, P devices 105, and routers 104 may be configured to store BGP path information in databases referred to as routing tables 115 to determine the fastest paths between resources. For example, when data packets arrive, the PE devices 110, P devices 105, and routers 104 may operate to refer to their routing tables 115 to determine which PE device 110, P device 105, or router 104 the packet should go to next.

For example, the ingress PE device $PE_0$ 110a associated with the access network 120 that the end user device 101 is connected to may be configured to determine to which server or servers 106 to route traffic. In a current Anycast networking system, the ingress PE device $PE_0$ 110a may be configured to select an Anycast server 106 based on a best path protocol. In some examples, the best path protocol may include selecting a nearest server based on a best path selection protocol (e.g., Interior Gateway Protocols (IGP), such as (Intermediate System to Intermediate System) IS-IS, may prefer a path based on a metric, cost, or other attribute; Border Gateway Protocol (BGP), such as internal BGP (iBGP), may use normal BGP best path selection methods). In the illustrated example, traffic directed from the ingress PE device $PE_0$ 110a to Servers $A_{1-6}$ 106a may include 2 hops (e.g., a first hop from the ingress PE device $PE_0$ 110a to a first egress PE device $PE_1$ 110b and a second hop from $PE_1$ 110b to the router associated with network segment A (Router $R_A$ 104a)); traffic directed to Servers $B_{1-2}$ 106b may include 3 hops (e.g., a first hop from the ingress PE device $PE_0$ 110a to a first P device $P_1$ 105a, a second hop from $P_1$ 105a to a second egress PE device $PE_2$ 110b, and a third hop from $PE_2$ 110b to the router associated with network segment B (Router $R_B$ 104b); and traffic directed to Servers $C_{1-4}$ 106c may include 4 hops (e.g., a first hop from the ingress PE device $PE_0$ 110a to a second P device $P_2$ 105b, a second hop from $P_2$ 105b to a third P device $P_3$ 105c, a third hop from $P_3$ 105c to a third egress PE device $PE_3$ 110d, and a fourth hop from $PE_3$ 110d to the router associated with network segment C (Router $R_C$ 104c).

Accordingly, in some example current Anycast networking systems, the content request may be routed to Servers $A_{1-6}$ 106a (which may be determined to be associated with a topologically shortest route) for serving the request in an effort to achieve quickest responses at optimal costs. However, this becomes problematic when, for example, the server(s) 106 associated with a network segment 102 are under attack or become congested or overwhelmed. For example, in current Anycast networking systems, in the event of a failure associated with a network segment 102, the next shortest route may be determined, and traffic may be redirected without having to change the Anycast IP address 112. However, when, for example, different network segments 102 have different volumes of traffic, the server 106 configuration in association with one network segment 102 may not be capable of handling traffic that may be redirected to it because of a server failure, malicious activity, or another traffic redirection triggering event.

Consider, for example, that Network Segment A 102a experiences a high volume of network traffic in comparison with Network Segment B 102b. For example, an area associated with an access network geographically and/or topologically close to Network Segment A 102a may have an increasing number of new customers, which may cause the demand on the servers 106 associated with Network Segment A 102a to increase. Accordingly, in current implementations, the increased traffic may be handled by adding additional servers 106 at Network Segment A 102a. As illustrated, Network Segment A 102a may utilize 6 servers 106 (Servers $A_1$-$A_6$ 106a) to accommodate the higher traffic volume, while 2 servers 106 (Servers $B_{1-2}$ 106b) may be utilized to handle the volume of traffic associated with Network Segment B 102b. Under normal operating conditions, such an arrangement of servers 106a may accommodate Network Segment A's 102 traffic load. However, in an example scenario where, for example one or more of Servers $A_1$-$A_6$ 106a may experience a failure or network attack, at least some of the network traffic may need to be redistributed to another server 106 (e.g., Servers $B_{1-2}$106b and/or Servers $C_{1-4}$ 106c).

Consider that Network Segment B 102b may be topologically/geographically closer to the access network 120 than Network Segment C 102c. Currently, based on current protocols utilized in an Anycast networking system, responsive to the server failure or network attack associated with Servers $A_1$-$A_6$ 106a, the network traffic may be redirected to the next topologically/geographically closest network segment 102, which in the illustrated example, is Network Segment B 102b. As can be appreciated the volume of traffic that may need to be redirected from Network Segment A 102a to Network Segment B 102b may cause the Servers $B_{1-2}$ 106b to become congested or overwhelmed. An overwhelmed server 106 may be susceptible to dropped packets. As a result, jitter may be experienced and/or latency may increase, thereby negatively impacting the overall performance of the networking system 100. Further consider that Servers $C_{1-4}$ 106c at Network Segment C 102c may be underutilized, for example, the servers 106c may normally operate at 50% operating capacity. Currently, due to the topologic and/or geographic distance of Network Segment C 102c from the access network 120, a current Anycast system may not normally select Servers $C_{1-4}$ 106c to balance network traffic, thereby preventing the networking system 100 from operating more efficiently. However, according to one or more aspects of the present disclosure, the networking system 100 may include and utilize a route orchestration system 116 to make and implement routing control decisions to redirect network traffic and provide load balancing in the networking system 100.

For example, the route orchestration system 116 may be configured to use artificial intelligence (AI) techniques and machine learning (ML) algorithms to analyze network resource performance characteristics information 118 for identifying a traffic redirection triggering event and for determining an optimized traffic control decision based on the network resource performance characteristics information 118. The network resource performance characteristics information 118, in some examples, may be stored on a network resource performance system 119. The network resource performance system 119 in some examples, may comprise one or more separate server(s) and/or storage element(s) operatively connected to the network 108 and operable to gather the network resource performance characteristics information 118. In other examples, the network resource performance system 119 may be distributed among one or more of the other devices 106, routers 104, servers 106, and/or the route orchestration system 116.

In some examples, the network resource performance characteristics information 118 may be based on data (e.g., NetFlow data) collected from various resources in the network 108 (e.g., PE devices 110, P devices 105, routers 104 and servers 106). For example, network resource performance characteristics information 118 may be analyzed by the route orchestration system 116 to determine a traffic redirection triggering event that indicates a network resource may be currently overwhelmed, is under a network attack, or is otherwise not performing efficiently. In an example, the network resource performance characteristics information 118 may indicate whether latency associated with a server 106 is above a latency threshold. In another example, the network resource performance characteristics information 118 may indicate that a server 106 is dropping more than a threshold number of packets. In another example, the network resource performance characteristics information 118 may indicate that a server 106 is under a network attack. In another example, the network resource performance characteristics information 118 may indicate that an operating capacity of a server 106. In another example, the network resource performance characteristics information 118 may indicate that a server 106 is operating under its configured operating capacity. Although specific network resource performance characteristics are mentioned in relation to possible traffic redirection triggering events, these are for example purposes only. Additional and/or alternative network resource performance characteristics and traffic redirection triggering events may be included and are within the scope of the present disclosure.

In some examples, the optimized traffic control decision determined by the route orchestration system 116 may include software defined networking (SDN) instructions that may be communicated to one or more network resources (e.g., PE devices 110, P devices 105, and/or routers 104) that may cause traffic (e.g., the content request) to be rerouted to the one or more other servers 106b,c. For example, the optimized traffic control decision may be determined to offload traffic from a non-performing server and/or improve load balancing amongst capable servers 106 and other network resources in the networking system 100, while minimizing avoidable network traffic. The optimized traffic control decision may be determined to potentially reduce the transmission time of the content to an end user device 101 connected to an access network 110 and/or otherwise increase operating efficiency of the servers 106a-c and other network resources. In some examples, one or more network resources (e.g., PE devices 110, P devices 105, and/or routers 104) may include a programmatic component 225 (shown in FIG. 2) that allows the optimized traffic control decision determined by the route orchestration system 116 to be implemented by the resources. In some implementations, the SDN instructions may be preferably communicated to and implemented by an ingress PE device $PE_0$ 110a to minimize unnecessary network traffic.

In some examples, the route orchestration system 116 may be further configured to monitor network resource performance characteristics information 118 related to network resources associated with the optimized traffic control decision to determine whether the network resource performance characteristics continue indicating the traffic redirection triggering event or another traffic redirection triggering event and/or whether the SDN instructions associated with the optimized traffic control decision can be suspended, removed, or modified to improve load balancing amongst the servers 106*a-c* and other network resources in the networking system 100 while minimizing unnecessary network traffic. For example, a second optimized traffic control decision may be made based on monitoring the network resource performance characteristics information 118, and the second optimized traffic control decision may include SDN instructions that may be communicated to the appropriate network resources that cause the associated PE devices 110, P devices 105, and routers 104 to implement the second optimized traffic control decision. As such, the servers 106*a-c* available throughout the network system 100 may be dynamically utilized to reshape network traffic and increase operating efficiency of the servers 106*a-c* and other network resources.

Figure 2:
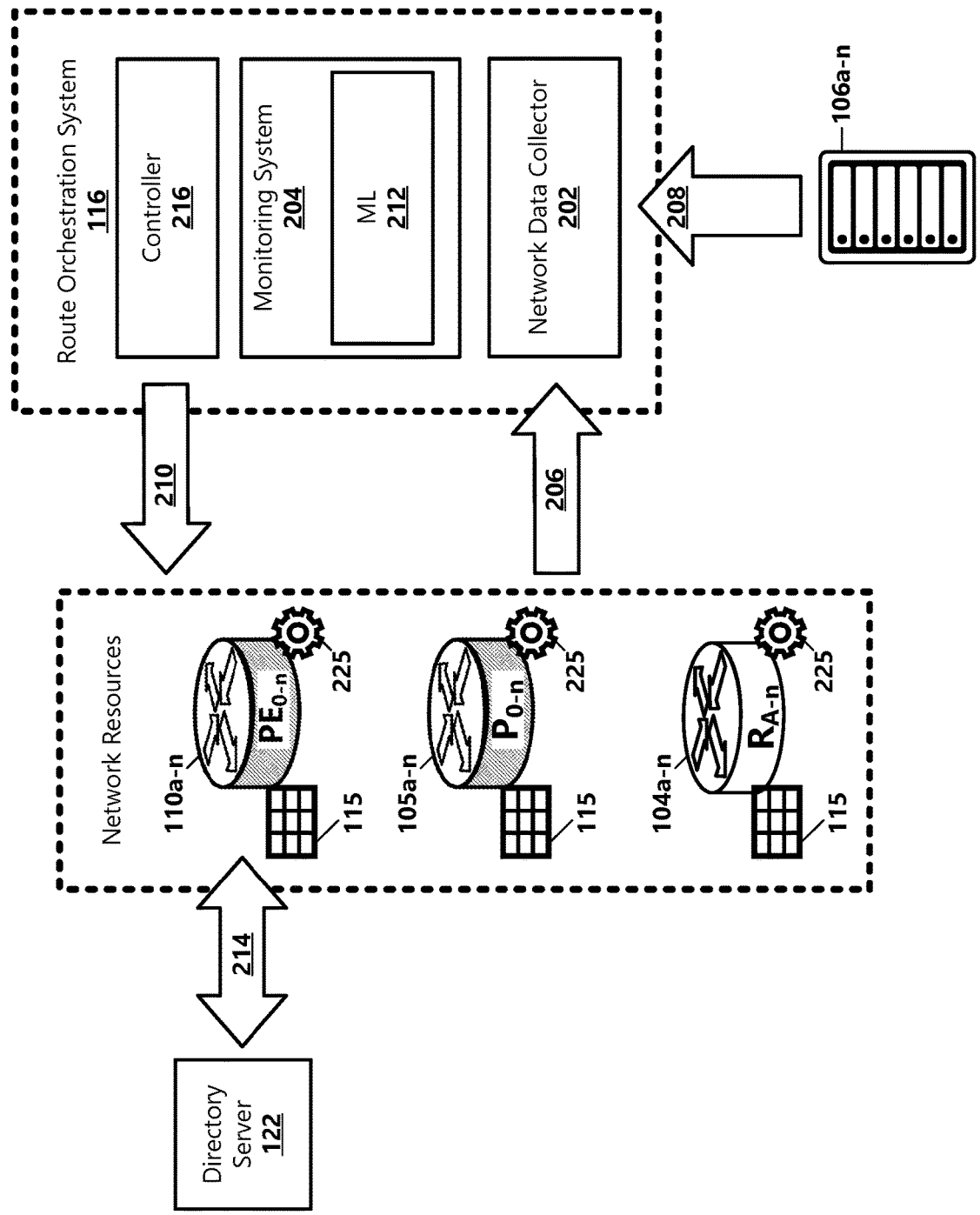
FIG. 2 is a block diagram illustrating components of an example embodiment of a route orchestration system.

With reference now to FIG. 2, various components of an example route orchestration system 116 and example communications directed to and from the route orchestration system 116 are illustrated. As should be appreciated, while a variety of operational components are described with respect to the route orchestration system 116, some components may be combined, additional or fewer components may be employed, and/or components and associated functionalities can be distributed throughout the networking system 100.

In some examples, the route orchestration system 116 may include a network data collector 202. For example, the network data collector 202 may be operative or configured to collect and analyze IP network traffic data 206 and server data 208 and determine network resource performance characteristics information 118 that can be used to determine various network performance characteristics, such as the source and destination of traffic, class of service, server capacities, loads on servers 106, causes of congestion, latency, dropped packets, etc. The network data collector 202 may be configured to collect the IP network traffic data 206 and server data 208 from various network resources (e.g., PE devices 110, P devices 105, routers 104 and servers 106). In some examples, the network data collector 202 may use a network protocol to send a first communication to one or more servers 106 in the network 108 and to receive a second communication from the one or more servers 106 to create a flow record including network resource performance characteristics information 118 that can be monitored and analyzed.

In some examples, the network data collector 202 may further operate to request load information from the PE devices 110, P devices 105, routers 104, and/or servers 106. In some examples, the PE devices 110, P devices 105, routers 104, and/or servers 106 may communicate network resource load information via an Application Programming Interface (API) exposed by the route orchestration system 116. In an example, the network resource performance characteristics information 118 may indicate whether latency associated with a server 106 is above a latency threshold. In another example, the network resource performance characteristics information 118 may indicate that a server 106 is dropping more than a threshold number of packets. In another example, the network resource performance characteristics information 118 may indicate that a server 106 is under a network attack. In another example, the network resource performance characteristics information 118 may indicate an operating capacity of a server 106. In another example, the network resource performance characteristics information 118 may indicate that a server 106 is operating under its configured operating capacity. Although specific network resource performance characteristics are mentioned in relation to possible traffic redirection triggering events, these are for example purposes only. Additional and/or alternative network resource performance characteristics and traffic redirection triggering events may be included and are within the scope of the present disclosure.

As illustrated in FIG. 2, the route orchestration system 116 may further include a monitoring system 204 operative or configured to analyze network resource performance characteristics information 118 and make optimizing traffic rerouting decisions based on the monitor network resource performance characteristics information 118. The network resource performance characteristics information 118 associated with various resources in the network 108 (e.g., PE devices 110, P devices 105, routers 104 and servers 106) may be analyzed by the monitoring system 204 to determine a traffic redirection triggering event that indicates a network resource may be currently overwhelmed, is under a network attack, or is otherwise not performing efficiently. For example, determinations may be made as to whether any performance characteristics metrics may be outside of a threshold, which may indicate server 106 or other network resource device failures, malicious activities, and/or inefficiencies in the networking system 100 for which performance characteristics may be improved/optimized.

In some examples, the monitoring system 204 may be configured to use ML algorithms 212 trained to analyze network resource performance characteristics information 118 and to use AI techniques to make automated decisions based on information learned by the ML algorithms 212. The ML algorithms 212 may be trained to learn information and characteristics about network resources that may be used as part of identifying a traffic redirection triggering event. In some examples, a traffic redirection triggering event may be identified based on a set of performance condition thresholds. For example, the traffic redirection triggering event may be triggered when a network resource is operating outside of the set of performance condition thresholds. In some examples, the ML algorithms 212 may be trained to learn performance condition thresholds that may be later used to evaluate IP network traffic data 206 and server data 208 for identifying traffic redirection triggering events. In some examples, performance condition thresholds may vary based on the resource (e.g., PE devices 110, P devices 105, routers 104 and servers 106), time, and/or other learnable attributes. In other examples, the monitoring system 204 may be configured to receive performance condition thresholds as an input.

In some examples, the ML algorithms 212 may be trained to determine an optimized traffic control decision for a traffic redirection triggering event. In one example, the monitoring system 204 may use ML 212 to analyze Unicast announcements transmitted by the servers 106 to determine a number of servers 106 associated with a particular network segment 102. In another example, the monitoring system 204 may use ML 212 to analyze protocol extensions associated with router implemented mechanisms that may split traffic between a plurality of individual servers 106 to determine a number of servers 106 associated with a network segment 102. For example, such inferred information can be used to determine resource utilization of servers 106 that may be selected as targeted servers 106b,c, optimal routes to the targeted servers 106b,c, etc. The monitoring system 204 may also be operatively connected to a provisioning system of a network 108 to help monitoring system determine a number of servers 106 associated with a particular network segment 102.

In some examples, the monitoring system 204 may be configured to monitor network resource performance characteristics information 118 periodically, continually, or continuously (e.g., continuous or near-continuous sampling). For example, the monitoring system 204 may be operative or configured to analyze network resource performance characteristics information 118 periodically, continually, or continuously to determine or otherwise detect the presence of a traffic redirection triggering event. Detection of a traffic redirection triggering event may inform the monitoring system 204 that one or more servers 106 associated with a network resource are not meeting performance thresholds. In some examples the ML algorithms 212 may be trained to learn an optimal frequency to perform sampling on the network 108, which may be implemented by the network data collector 202 and the monitoring system 204. In some examples, the monitoring system 204 may be configured to make a traffic rerouting decision on demand, such as in response to a request from a network resource.

In some examples, based on a determination that performance characteristics associated with a network resource fall outside a threshold, the monitoring system 204 may determine one or more targeted servers 106 to redirect traffic to and a method to redirect traffic to the one or more targeted servers 106b-c to improve the network resource performance characteristics. The method may include SDN instructions that may be communicated to one or more network resources. For example, the determinations may be made to potentially reduce the transmission time of the content to an end user device 101 connected to an access network 110 and/or otherwise increase operating efficiency of the servers 106a-c and other network resources.

As an example, a traffic redirection triggering event may be identified when network resource performance characteristics information 118 indicate latency associated with one or more of Servers $A_1$-$A_6$ 106a is above a latency threshold, one or more of Servers $A_1$-$A_6$ 106a are dropping more than a threshold number of packets, one or more of Servers $A_1$-$A_6$ 106a are under a network attack, or the like. The monitoring system 204 may operate to determine an optimized traffic control decision that targets one or more other servers 106b,c configured to serve the requested content and to communicate SDN instructions 210 that may cause the associated networking devices (e.g., PE devices 110, P devices 105, e.g., routers 104) to reroute traffic to the one or more targeted servers 106b,c based on the optimized traffic control decision. In some examples, the one or more targeted servers 106b,c may be identified based on unique IP addresses, such as their individually assigned Unicast IP Addresses 114 (e.g., Unicast Address: 123.00.00.02 for Servers $B_{1-2}$ 106b and Unicast Address: 123.00.00.03 for Servers $C_{1-4}$ 106c). The optimized traffic control decision may be determined to improve load balancing amongst the servers 106a-c and other network resources in the networking system 100 while minimizing unnecessary network traffic.

In some examples, the route orchestration system 116 further includes a controller 216 operative or configured to communicate SDN instructions 210 associated with the optimized traffic control decision to one or more network resources. For example, the controller 216 may communicate SDN instructions 210 to one or more ingress PE devices $PE_0$ 110a that may normally (i.e., according to its normal routing protocol, such as Anycast) direct ingress traffic to a server 106 that has been identified as being associated with an identified traffic redirection triggering event (e.g., Servers $A_1$-$A_6$ 106a). In some examples, the SDN instructions 210 may include instructions for directing ingress traffic (e.g., content requests) to targeted server(s) 106b,c along a static route. For example, the instructions 210 may instruct the ingress PE device $PE_0$ 110a to choose the static route over another route that may be a better route based on topological distance.

In other examples, rather than implementing a static route, the controller 216 may operate to communicate SDN instructions 210 to one or more network resources that may cause the one or more resources to manipulate a routing table 115 such that a route to the targeted server(s) 106b,c may appear as a best route (e.g., shortest topological route from the ingress PE device $PE_0$ 110a) that may be selected by the ingress PE device $PE_0$ 110a. In some examples, BGP path information may be manipulated by instructions 210 communicated by the controller 216 to redirect traffic to a particular server 106 based on and/or in association with a determined optimized traffic control decision. For example, the optimized traffic control decision may be determined to potentially reduce the transmission time of the content to the end user device 101 and/or otherwise increase operating efficiency of the servers 106a-c and other network resources.

For example, the SDN instructions 210 associated with the optimized traffic control decision may be communicated by the controller 216 to one or more PE devices 110, P devices 105, and/or routers 104 in the network 108 to generate advertisements or other types of notifications that may cause one or more routes to the targeted server(s) 106b,c to appear, to the ingress PE device $PE_0$ 110a, as the best route (e.g., shortest topological route). Accordingly, the PE device $PE_0$ 110a may adjust its routing table 115 and direct the content request and associated traffic along a route to the targeted server(s) 106b,c. For example, the advertisements may indicate that administrative costs or route metrics associated with using the targeted server(s) 106b,c to route network traffic appear to be more favorable or otherwise equivalent to any administrative costs or route metrics associated with using local or more proximate servers 106a, such as a local or more proximate server that may be overwhelmed, congested, or being attacked.

In some examples, the controller 216 may communicate SDN instructions 210 to one or more PE devices 110, P devices 105, and/or routers 104 in the network 108 that may cause the one or more resources to adjust one or more routes to a local or more proximate server 106 that may be overwhelmed, congested, or attacked (e.g., a server associated with a traffic redirection triggering event), such that the one or more routes appear as less favorable routes than one or more routes to the targeted server(s) 106b,c. In some examples, the SDN instructions 210 may cause one or more PE devices 110, P devices 105, and/or routers 104 in the network 108 to remove the one or more routes to the server 106a associated with the traffic redirection triggering event from their routing tables 115. For example, the programmatic component 225 included in the one or more PE devices 110, P devices 105, and/or routers 104 operates to receive instructions from the controller 216 and process the instructions for implementing the optimized traffic control decision.

As described above, in some examples, an ingress PE device $PE_0$ 110a may operate to communicate 214 with the directory server 122 to resolve a domain name to an IP address for a server 106 from which an end user device 101 can retrieve requested content. For example, the directory server 122 may be configured to include the Anycast IP address 112 announced by one or more servers 106a-c configured to serve the requested content in a response to the request from the ingress PE device $PE_0$ 110a. Utilizing one or more aspects of the route orchestration system 116, the ingress PE device $PE_0$ 110a may operate to implement any SDN instructions 210 received from the route orchestration system 116. In some examples, if the received IP address from the directory server 122 includes an IP address associated with the SDN instructions 210, the ingress PE device $PE_0$ 110a may be instructed to select a static route included in the instructions to redirect the associated traffic to one or more targeted servers 106b,c. In other examples, based on SDN instructions 210 received from the controller 216, the ingress PE device $PE_0$ 110a may adjust its routing table 115, which may cause the ingress PE device $PE_0$ 110a to select a route to a targeted server 106b,c instead of a route to a server associated with an identified traffic redirection triggering event.

In some examples, the monitoring system 204 may be operative or configured to monitor network resources associated with an implemented traffic rerouting decision (e.g., network resources that have received and implemented SDN instructions 210 associated with the traffic rerouting decision). For example, based on resource performance characteristics information 118 that may be collected by the network data collector 202 and analyzed by the monitoring system 204, a determination may be made as to whether the traffic reshaping changes made in association with the implemented traffic rerouting decision are still needed, no longer needed, need to be modified, or whether additional rerouting instructions may need to be implemented. For example, a traffic rerouting decision may be implemented to resolve a short-term problem, and the monitoring system 204 may be configured to determine whether performance characteristics information indicate whether the short-term problem persists or has been resolved. When a determination is made that the short-term problem has been resolved, the traffic reshaping changes implemented as part of the traffic rerouting decision may be undone by additional SDN instructions 210 that may be communicated by the controller 216 to the ingress PE device ($PE_0$ 110a) and/or other relevant PE devices 110. Accordingly, aspects of the route orchestration system 116 provide dynamic and self-healing optimized traffic rerouting.

Figure 3:
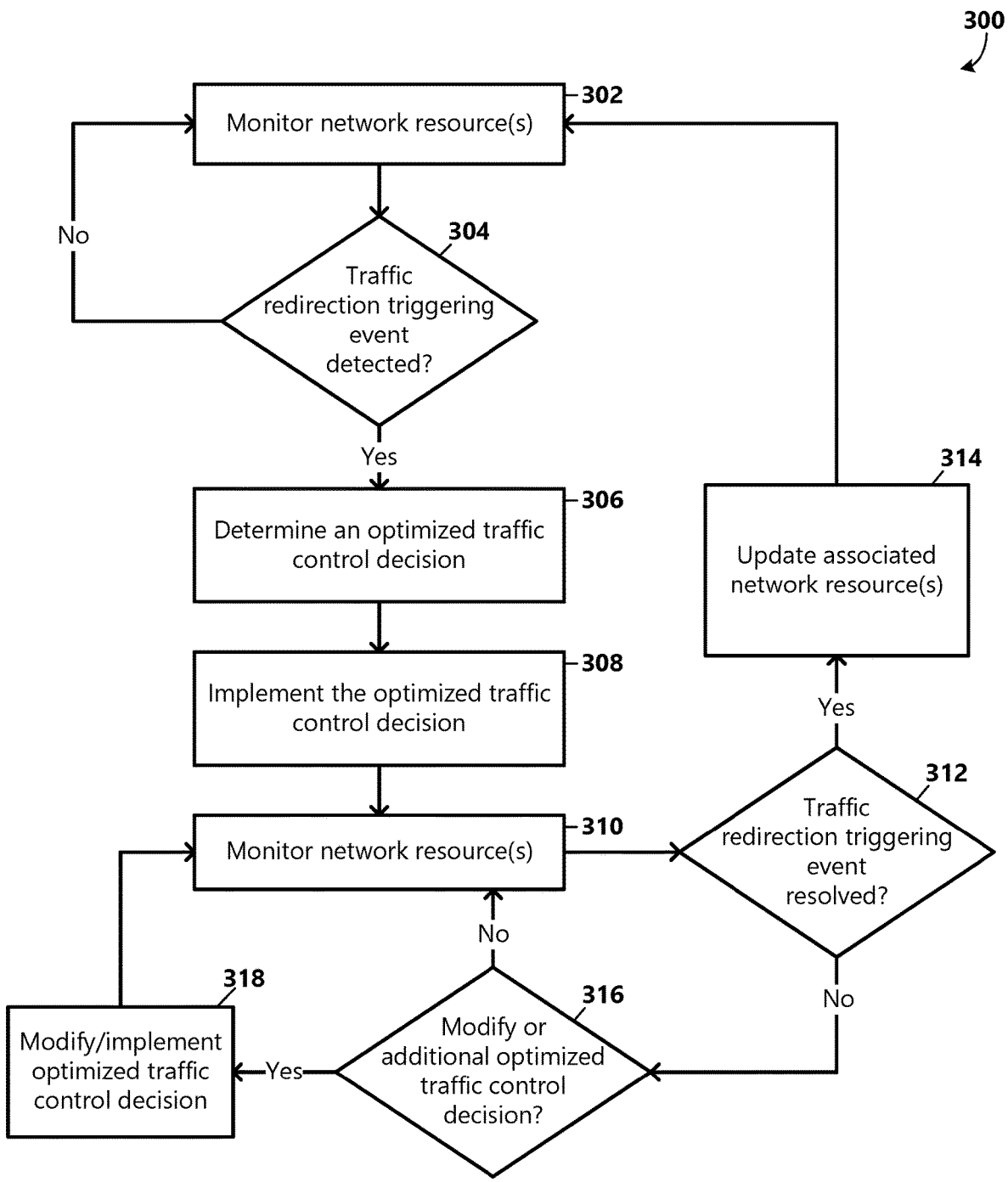
FIG. 3 is a flow diagram depicting general stages of an example process for using the example route orchestration system to provide dynamic and self-healing optimized traffic rerouting according to an embodiment.

FIG. 3 is a flow diagram that depicts general stages of an example method 300 for using the example route orchestration system 116 to provide dynamic and self-healing optimized traffic rerouting by determining and implementing optimized traffic routing decisions according to an embodiment. At OPERATION 302, performance conditions of one or more network resources of the networking system 100 may be collected and analyzed. As described above, the one or more network resources may include one or more PE devices 110, P devices 105, routers 104, and/or servers 106. In some examples, IP network traffic data 206 and/or server data 208 associated with performance conditions of the one or more PE devices 110, PE devices 105, routers 104 and/or servers 106 may be collected and stored as network resource performance characteristics information 118 by the network data collector 202. For example, the network resource performance characteristics information 118 may comprise flow records and resource load records. Further, the network resource performance characteristics information 118 may be analyzed by the monitoring system 204 for determining whether one or more network resources associated with the network address request may be operating outside of a threshold.

At DECISION OPERATION 304, a determination may be made whether one or more servers 106 or other network resources in the networking system 100 are meeting performance condition thresholds. For example, network resource performance characteristics information 118 may be analyzed by the monitoring system 204 to determine or otherwise detect the presence of a traffic redirection triggering event. Detection of a traffic redirection triggering event may inform the monitoring system 204 that one or more servers 106 may not be meeting performance thresholds. For example, the performance condition thresholds may be set to indicate whether the one or more servers 106 are dropping packets, are under attack, etc. As described above, the performance condition thresholds may be determined automatically based on network resource performance characteristics information 118 analyzed by ML and AI algorithms included in the monitoring system 204.

When resources in the network 108 are operating efficiently and no traffic redirection triggering events are detected, no action may be taken by the controller 216 to redirect traffic, and performance conditions of one or more network resources of the networking system 100 may continue to be collected and analyzed at OPERATION 302.

When a traffic redirection triggering event is detected at DECISION OPERATION 304, an optimized traffic control decision may be made by the monitoring system 204 at OPERATION 306. The optimized traffic control decision may be determined to alleviate one or more performance conditions associated with the identified traffic redirection triggering event. For example, the optimized traffic control decision may be determined to offload traffic from a non-performing server 106a (e.g., based on network resource performance characteristics information 118) and/or improve load balancing amongst capable servers 106b,c and other network resources in the networking system 100, while minimizing unnecessary network traffic.

At OPERATION 308, the determined optimized traffic control decision may be implemented. For example, the controller 216 may communicate SDN instructions 210 to one or more network resources associated with the decision. As described above, in some examples, the SDN instructions 210 may include a static route that may be communicated to and implemented by one or more ingress PE devices $PE_0$ 110a. In other examples, the SDN instructions 210 may be associated with advertisements that may cause one or more network resources to adjust their routing tables 115 to favor routes to one or more targeted servers 106b,c over routes to one or more non-performing servers 106a. In some example, the SDN instruction 210 may include instructions for tunneling packets from one PE device to another to allow the optimized traffic control decision to occur (e.g., an MPLS pseudowire or a Generic Routing Encapsulation (GRE) tunnel). In other examples, the SDN instructions 210 may be communicated to one or more network resources via an API exposed by the route orchestration system 116.

Accordingly, the one or more network resources may implement the SDN instructions 210. In some examples, the one or more network resources may update their routing tables 115 based on information received from the controller 216. For example, the updates to the routing table(s) 115 may cause an ingress PE device $PE_0$ 110a to direct a content request to a targeted server 106*b,c* rather than to a server associated with a traffic redirection triggering event. In other examples, an ingress PE device PE$_O$ 110*a* may select a programmatic static route to direct a content request to a targeted server 106*b,c*.

At OPERATION 310, performance conditions of one or more network resources associated with the identified traffic redirection triggering event and/or optimized traffic decision may be monitored at OPERATION 310. For example, IP network traffic data 206 and server data 208 associated with the overwhelmed, congested, attacked, or otherwise non-performing server(s) 106*a* may be analyzed to determine whether the traffic redirection triggering event has been resolved.

At DECISION OPERATION 312, a determination may be made as to whether network resource performance characteristics information 118 indicate that the traffic redirection triggering event has been resolved. For example, if the previously non-performing server 106*a* (and other network resources associated with the traffic redirection triggering event) are operating within the set of performance condition thresholds, at OPERATION 314, additional SDN instructions 210 may be automatically communicated to the appropriate network resources to undo, reverse, or otherwise adjust changes implemented as part of the implemented optimized traffic control decision. In one example, the additional SDN instructions 210 may be associated with advertisements that may cause one or more network resources to adjust their routing tables 115 to no longer favor routes to the targeted servers 106*b,c* over routes to a previously non-performing server 106*a*. In another example, the additional SDN instructions 210 may be associated with instructing a PE device 110, P device 105, or router 104 to withdraw the static route. For example, adjustments associated with SDN instructions 210 communicated at OPERATION 314 may cause the network resources to select a local or more proximate server 106 that may have previously been overwhelmed, congested, or attacked.

If network resource performance characteristics information 118 indicate that the traffic redirection triggering event has not been resolved at DECISION OPERATION 312, another determination may be made at DECISION OPERATION 316 as to whether to adjust the implemented optimized traffic control decision and/or implement a second optimized traffic control decision to resolve the traffic redirection triggering event.

When a determination is made to adjust the implemented optimized traffic control decision and/or implement the second optimized traffic control decision, SDN instructions associated with the adjustments and/or second optimized traffic control decision may be communicated to the appropriate network resources (e.g., PE devices 110, P devices 105, and/or routers 104). For example, the SDN instructions may be communicated to the appropriate network resources by the controller 216. Accordingly, the network resources (e.g., PE devices 110, P devices 105, and/or routers 104) may update their routing tables 115, withdraw the static route, and/or configure a second static route, or otherwise implement the second optimized traffic control decision. The method 300 may return to OPERATION 310, where performance conditions of one or more network resources associated with the identified traffic redirection triggering event, first optimized traffic decision, and/or second optimized traffic decision may be monitored. As such, the servers 106*a-c* available throughout the network system 100 may be dynamically utilized to reshape network traffic and increase operating efficiency of the servers 106*a-c* and other network resources.

Figure 4:
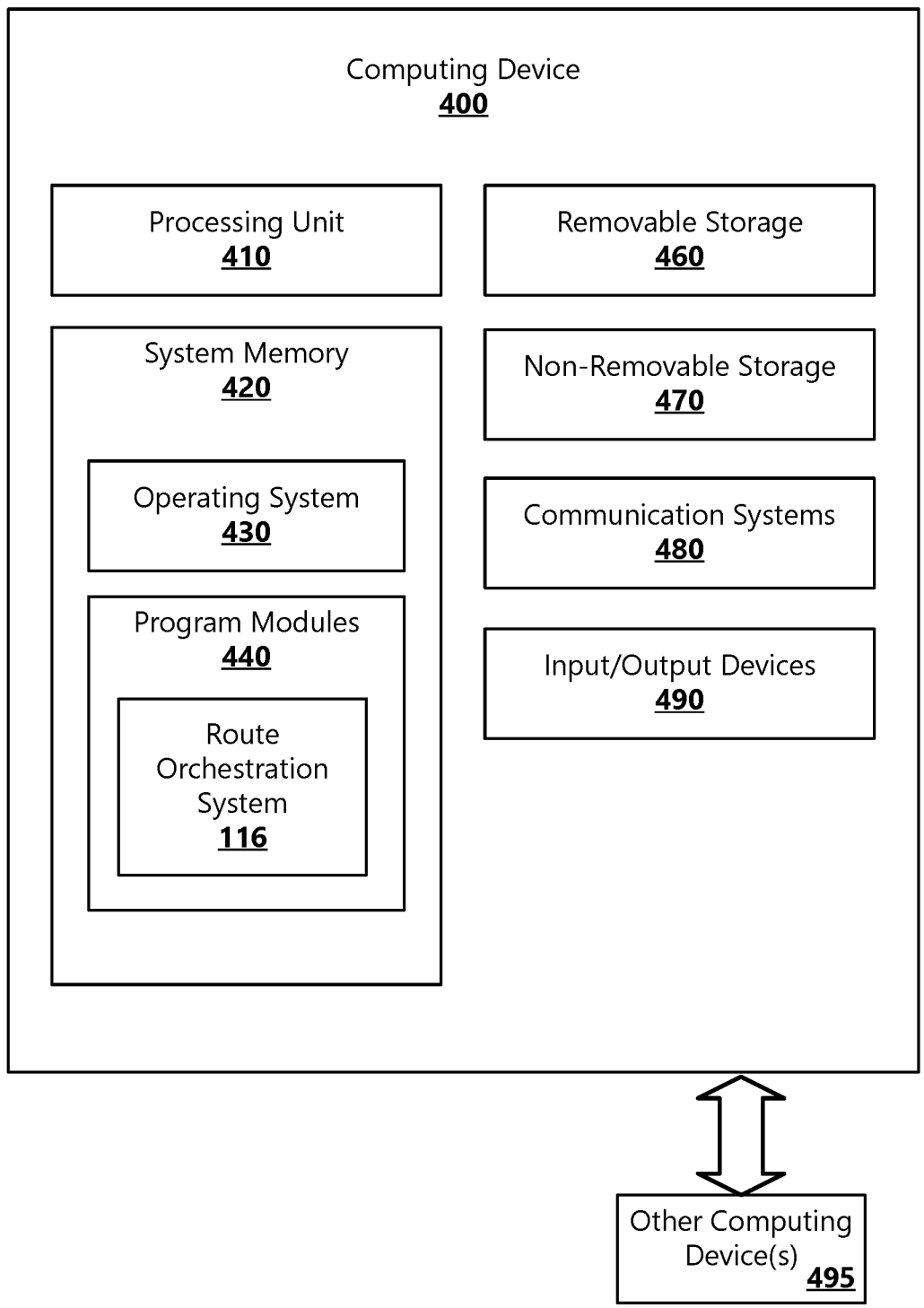
FIG. 4 is a block diagram illustrating example physical components of a computing device or system with which embodiments may be practiced.

FIG. 4 is a block diagram illustrating example physical components of a computing device or system with which embodiments may be practiced. The computing device 400, or various components and systems of the computing device 400, may be integrated or associated with the route orchestration system 116, an end user device 110, and/or a network resource (e.g., a server 106, a router 104, a P device 105, a PE device 110). As shown in FIG. 4, the physical components (e.g., hardware) of the computing device are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. A number of different program modules 440 and data files may be stored in the system memory 420. While executing on the processing unit 410, the program modules 440 may perform the various processes described above. In some examples, the program modules 440 may include one or more optimized traffic rerouting applications 450, which may be responsible for performing one or a combination of the operations described above with respect to FIGS. 1-3.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, one or more components of the route orchestration system 116, the end user device 110, network resources (e.g., servers 106, routers 104, P devices 105, PE devices 110), and the like. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for redirecting traffic in a network, the system comprising:
    at least one processor; and
    a memory coupled to the at least one processor, the memory including instructions that when executed by the at least one processor cause the system to:
        monitor network resource performance characteristics information associated with a plurality of network segments in a network;
        detect a traffic redirection triggering event associated with a first network segment of the plurality of network segments according to a first routing protocol;
        based on detecting the traffic redirection triggering event, determine a second network segment of the plurality of network segments to redirect traffic to from the first network segment;
        send a set of instructions to at least one network resource in the network causing the at least one network resource to redirect at least a portion of ingress traffic to the second network segment that would otherwise be directed to the first network segment according to the first routing protocol, wherein the second network segment is more topologically distant from the at least one network resource than the first network segment;
        monitor network resource performance characteristics information associated with the first network segment and the second network segment;
        continue to detect, based on the network resource performance characteristics information, the traffic redirection triggering event associated with the first network;
        determine a third network segment of the plurality of network segments to which to redirect at least a portion of ingress traffic that would otherwise be directed to the first network segment according to the first routing protocol; and
        send a subsequent set of instructions to the at least one ingress network resource in the network causing the at least one ingress network resource to redirect ingress traffic to the third network segment, wherein the third network segment is more topologically distant from the at least one ingress network resource than the first segment.

2. The system of claim 1, wherein the set of instructions include software defined networking (SDN) instructions defining a static route that, when implemented by the at least one network resource, causes the at least one network resource to redirect traffic to the second network segment.

3. The system of claim 1, wherein the set of instructions include software defined networking (SDN) instructions includes an advertisement indicating an administrative cost associated with using the second network segment is more favorable or equivalent to an administrative cost associated with using the first network segment.

4. The system of claim 3, wherein the set of instructions cause the at least one network resource to update a routing table based on the advertisement.

5. The system of claim 4, wherein:
    the first routing protocol is an Anycast protocol;
    a server associated with the first network segment and a server associated with the second network segment advertise a same Anycast IP address; and
    the at least one network resource includes an ingress routing device configured to select the server associated with the second network segment to redirect at least a portion of ingress traffic to based on the update to the routing table.

6. The system of claim 1, wherein the system is further operative to:
   determine, based on the network resource performance characteristics information, the traffic redirection triggering event associated with the first network is resolved; and
   send a second set of instructions to the at least one network resource, which when implemented by the at least one network resource, causes the at least one network resource to reverse or adjust the first set of instructions that causes the at least one network resource to redirect at least a portion of ingress traffic from the first network segment to the second network segment.

7. The system of claim 1, wherein the system is operative to use machine learning algorithms to learn performance condition thresholds that are used to evaluate network resource performance characteristics information for identifying traffic redirection triggering events.

8. The system of claim 1, wherein the system is operative to use machine learning algorithms to learn attributes about the second network segment that are used to determine to redirect at least a portion of ingress traffic to the second network segment.

9. A method for redirecting traffic in a network, comprising:
   monitoring network resource performance characteristics information associated with a plurality of network segments in a network operating according to a first routing protocol;
   detecting a traffic redirection triggering event associated with a first network segment of the plurality of network segments;
   based on detecting the traffic redirection triggering event, determining a second network segment of the plurality of network segments to redirect traffic to from the first network segment;
   sending a set of instructions to at least one network resource in the network causing the at least one network resource to redirect at least a portion of ingress traffic to the second network segment that would otherwise be directed to the first network segment according to the first routing protocol, wherein the second network segment is more topologically distant from the at least one network resource than the first network segment;
   monitoring network resource performance characteristics information associated with the first network segment and the second network segment;
   continuing to detect, based on the network resource performance characteristics information, the traffic redirection triggering event associated with the first network;
   determining a third network segment of the plurality of network segments to which to redirect at least a portion of ingress traffic that would otherwise be directed to the first network segment according to the first routing protocol; and
   sending a subsequent set of instructions to the at least one ingress network resource in the network causing the at least one ingress network resource to redirect ingress traffic to the third network segment, wherein the third network segment is more topologically distant from the at least one ingress network resource than the first segment.

10. The method of claim 9, further comprising:
    determining, based on the network resource performance characteristics information, the traffic redirection triggering event associated with the first network is resolved; and
    sending a second set of instructions to the at least one network resource, which when implemented by the at least one network resource, causes the at least one network resource to reverse or adjust the first set of instructions that causes the at least one network resource to redirect at least a portion of ingress traffic from the first network segment to the second network segment.

11. The method of claim 9, wherein sending the set of instructions includes sending software defined networking (SDN) instructions defining a static route that, when implemented by the at least one network resource, causes the at least one network resource to redirect at least a portion of ingress traffic to the second network segment.

12. The method of claim 9, wherein sending the set of instructions includes sending software defined networking (SDN) instructions including an advertisement indicating an administrative cost associated with using the second network segment is more favorable or equivalent to an administrative cost associated with using the first network segment and causing the at least one network resource to update a routing table based on the advertisement.

13. The method of claim 9, further comprising using machine learning algorithms to learn performance condition thresholds that are used to evaluate network resource performance characteristics information for identifying traffic redirection triggering events.

14. The method of claim 9, further comprising using machine learning algorithms to learn attributes about the second network segment that are used to determine to redirect traffic to the second network segment.

15. A computer readable storage device that includes executable instructions which, when executed by a processor redirect traffic in a network, the instructions comprising:
    monitoring network resource performance characteristics information associated with a plurality of network segments in a network operating according to an Anycast routing protocol;
    detecting a traffic redirection triggering event associated with a first network segment of the plurality of network segments;
    based on detecting the traffic redirection triggering event, determining a second network segment of the plurality of network segments to redirect traffic to from the first network segment;
    sending a set of instructions to the at least one ingress network resource in the network causing the at least one ingress network resource to redirect at least a portion of ingress traffic to the second network segment that would otherwise be directed to the first network segment according to the Anycast routing protocol, wherein the second network segment is more topologically distant from the at least one ingress network resource than the first network segment;
    monitoring network resource performance characteristics information associated with the first network segment and the second network segment;

continuing to detect, based on the network resource performance characteristics information, the traffic redirection triggering event associated with the first network;

determining a third network segment of the plurality of network segments to which to redirect at least a portion of ingress traffic that would otherwise be directed to the first network segment according to the Anycast routing protocol; and sending a subsequent set of instructions to the at least one ingress network resource in the network causing the at least one ingress network resource to redirect ingress traffic to the third network segment, wherein the third network segment is more topologically distant from the at least one ingress network resource than the first network segment.

16. The computer readable storage device of claim 15, wherein the set of instructions include software defined networking (SDN) instructions defining a static route that, when implemented by the at least one ingress network resource, causes the at least one ingress network resource to redirect at least a portion of ingress traffic to the second network segment along the static route.

17. The computer readable storage device of claim 15, wherein:

each of the plurality of network segments is associated with a router and a server;

each server is configured with an individual Unicast IP address and is configured to advertise an Anycast IP address shared amongst the servers associated with the plurality of network segments; and the static route links the at least one ingress network resource to the server associated with the second network segment, wherein the server associated with the second network segment is identified by its individual Unicast IP address.

18. The computer readable storage device of claim 15, wherein the set of instructions include software defined networking (SDN) instructions that cause the at least one ingress network resource to update a routing table with information that indicate that an administrative cost associated with using the second network segment is more favorable or equivalent to an administrative cost associated with using the first network segment.

19. The computer readable storage device of claim 15, further comprising:

determining, based on the network resource performance characteristics information, the traffic redirection triggering event associated with the first network is resolved; and sending a second set of instructions to the at least one ingress network resource, which when implemented by the at least one ingress network resource, causes the at least one ingress network resource to reverse or adjust the first set of instructions.

\* \* \* \* \*